United States Patent [19]

Tierney et al.

[11] Patent Number: 5,513,315
[45] Date of Patent: Apr. 30, 1996

[54] SYSTEM AND METHOD FOR AUTOMATIC TESTING OF COMPUTER SOFTWARE

[75] Inventors: James R. Tierney, Kirkland, Wash.; Noel Cross, Eugene, Oreg.

[73] Assignee: Microsoft Corporation, Redmond, Wash.

[21] Appl. No.: 995,746

[22] Filed: Dec. 22, 1992

[51] Int. Cl.⁶ .................................................... G06F 11/00
[52] U.S. Cl. ................ 395/183.13; 395/182.08; 395/182.21
[58] Field of Search .................................. 395/575, 375, 395/500; 371/79, 29.1

[56] References Cited

U.S. PATENT DOCUMENTS 5,157,779  10/1992  Washburn et al. .................... 395/575
5,157,782  10/1992  Tuttle et al. .......................... 395/575

OTHER PUBLICATIONS

*Serviceability Tools in OS/2 2.0* by Allen M. Gilbert, IBM Personal Systems Technical Solutions magazine, Jul. 1992, pp. 58–66.
*Operating System Concepts*, Third Edition by Abraham Silberschatz et al. ©1991 by Addison–Wesley Publishing Co., Inc. p. 196.
*Microsoft Press™ Computer Dictionary*, Second Edition ©1994 by Microsoft Press, pp. 195–196.
Musa et al., *Software Reliability: Measurement, Prediction and Application* McGraw–Hill Book Company, 1987, pp. 3–20.

*Primary Examiner*—Vincent P. Canney
*Attorney, Agent, or Firm*—Seed and Berry

[57] ABSTRACT

A system and method for automatically testing software using a deterministic acceptance test and random command sequence selections to more rapidly uncover errors in computer software. A results analyzer checks test parameters following the execution of each of a series of predetermined test commands and a series of random test commands to determine if the commands were properly executed. The test command sequences and test results determined by the results analyzer are stored in a log file which may be examined by the tester. The randomly selected test command sequence is stored in a tracker log file. The tester may reexecute the tracker file in its entirety or any portion selected by the tester as a means of determining the cause of an error in the software. The system also provides for error recovery. When an error is detected, the system restarts the test of the computer software and continues maintaining the log file and the tracker file. The system also uses the probabilities for various responses that an end-user may make in response to a particular screen display or program state. The system may select random responses corresponding to the probabilities. These probabilities are calculated for each individual screen display or software state. Because the present invention executes a random selection of command sequences, a particular applications program may be tested on multiple machines, thereby decreasing the overall time required for acceptance testing.

66 Claims, 5 Drawing Sheets

SYSTEM AND METHOD FOR AUTOMATIC TESTING OF COMPUTER SOFTWARE

TECHNICAL FIELD

The present invention relates to a system and method of software testing. More specifically, the present invention relates to a system and method for automatic testing of computer software using a computer system.

BACKGROUND OF THE INVENTION

Testing newly developed software is an essential part of the process of software product development. Software developers use a variety of techniques to test software for errors. Often the software is tested at a "beta" test site; that is, the software developer enlists the aid of outside users to test the new software. The users, often under a nondisclosure agreement, will use the new software and report on any errors found in the software. This is a long and difficult process because many person-years of testing are required to ensure that the new software has no errors. If only one or two beta test sites are used, the process consumes long periods of time because the small number of users are less likely to uncover errors than a large group of testers using the software in a variety of applications. As a result, software developers generally use a large number of beta test sites in order to reduce the time required for testing the software. Beta testing is a costly process because of the large number of test sites involved.

Other software developers utilize automatic software testing in order to reduce the cost and time for software testing. In a typical automatic software testing system, the software is run through a series of predetermined commands until an error is detected. The automated test system will generally halt upon detection of an error. This deterministic type of automated testing is still a costly and time-consuming process because complete testing of the software product requires that the automatic test system use every possible permutation of options on the software being tested in order to ensure that unusual combinations of program commands will not cause an error.

While automatic software testing has the advantage that it detects errors that would not be found using only a limited number of beta test sites, errors must be corrected one at a time as they are detected by the automatic test system. On the other hand, beta testing has the advantage that a large number of beta test sites may detect a number of errors that can be corrected in a single revision rather than correcting one error at a time. However, neither approach offers a cost effective way to detect a large number of errors in software under development.

Therefore it can be appreciated that there is a significant need for a system and method of automatic testing which will allow thorough testing of software at a reduced cost and in a limited period of time.

SUMMARY OF THE INVENTION

The present invention is embodied in a system using a random test generator to generate a series of random commands to the software. Each of the randomly selected commands is recorded in a tracker log file, and a results analyzer checks the computer software to assure that the proper results are obtained after each command. In one embodiment, the results analyzer records in a test log all commands and the results of the analysis following the execution of each command, including the detection of any errors encountered in the software. The software testing may be restarted after the detection of an error.

Selected portions of the tracker log file may be reexecuted to aid in finding the cause of errors. The tester may examine the test log and recorded errors to determine which portions of the test sequence may have generated a particular error. Based on an analysis of the test log, the tester selects the portion of the tracker log file to be reexecuted.

In a preferred embodiment of the invention, a set of preliminary tests is performed to assure that the computer software can execute the preliminary tests. Following the successful completion of the preliminary tests, the random test generator begins to execute a series of random commands.

In the preferred embodiment, an operational profile of the computer software is constructed to predict the probability of end-user selections in response to a particular program state. The random test selector may use this operational profile to select commands for the computer software to execute. The operational profile may change from one program state to another.

DETAILED DESCRIPTION OF THE INVENTION

The present invention performs a series of tests on software to detect errors. A system according to a preferred embodiment of the present invention performs a series of preliminary tests as well as a series of random test command sequences. Software under test may generally be broken down to a series of states or levels, with the screen displays and user choices varying for each state. The system of the present invention uses a series of program commands that are specifically tailored to test each particular program state. The inventive system uses both deterministic and random testing to detect errors in software under test.

Figure 1A:
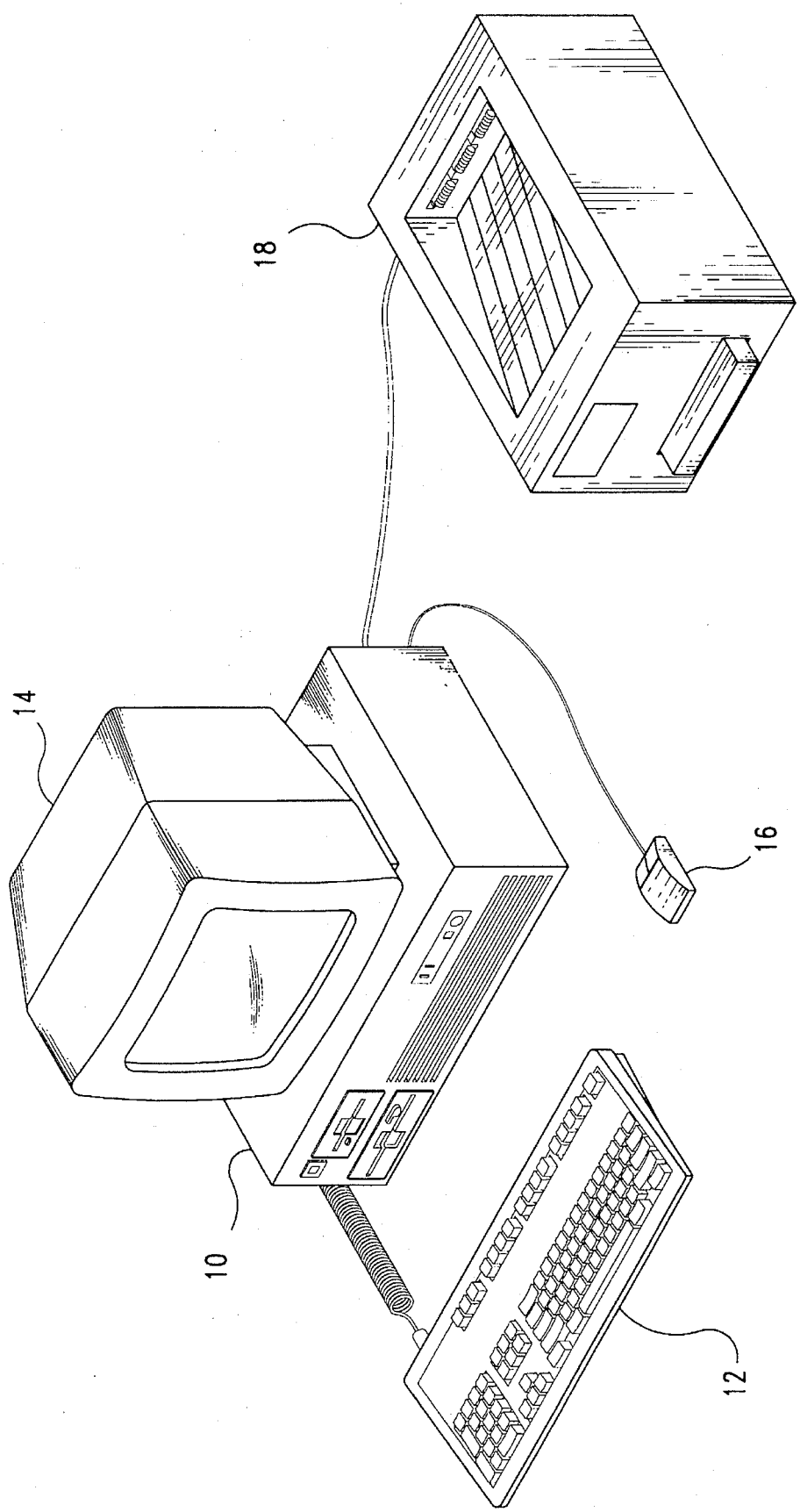
FIG. 1A illustrates a typical computer utilizing the present invention.

The inventive system may be readily implemented on a computer 10, shown in FIG. 1. The software under test is typically designed to operate on the computer 10, which usually has a keyboard 12 and a display screen 14. The computer 10 may also have a computer mouse 16 and a printer 18 attached. The mouse 16 has one or more mouse buttons 17 to enter commands into the computer 10.

Figure 1B:
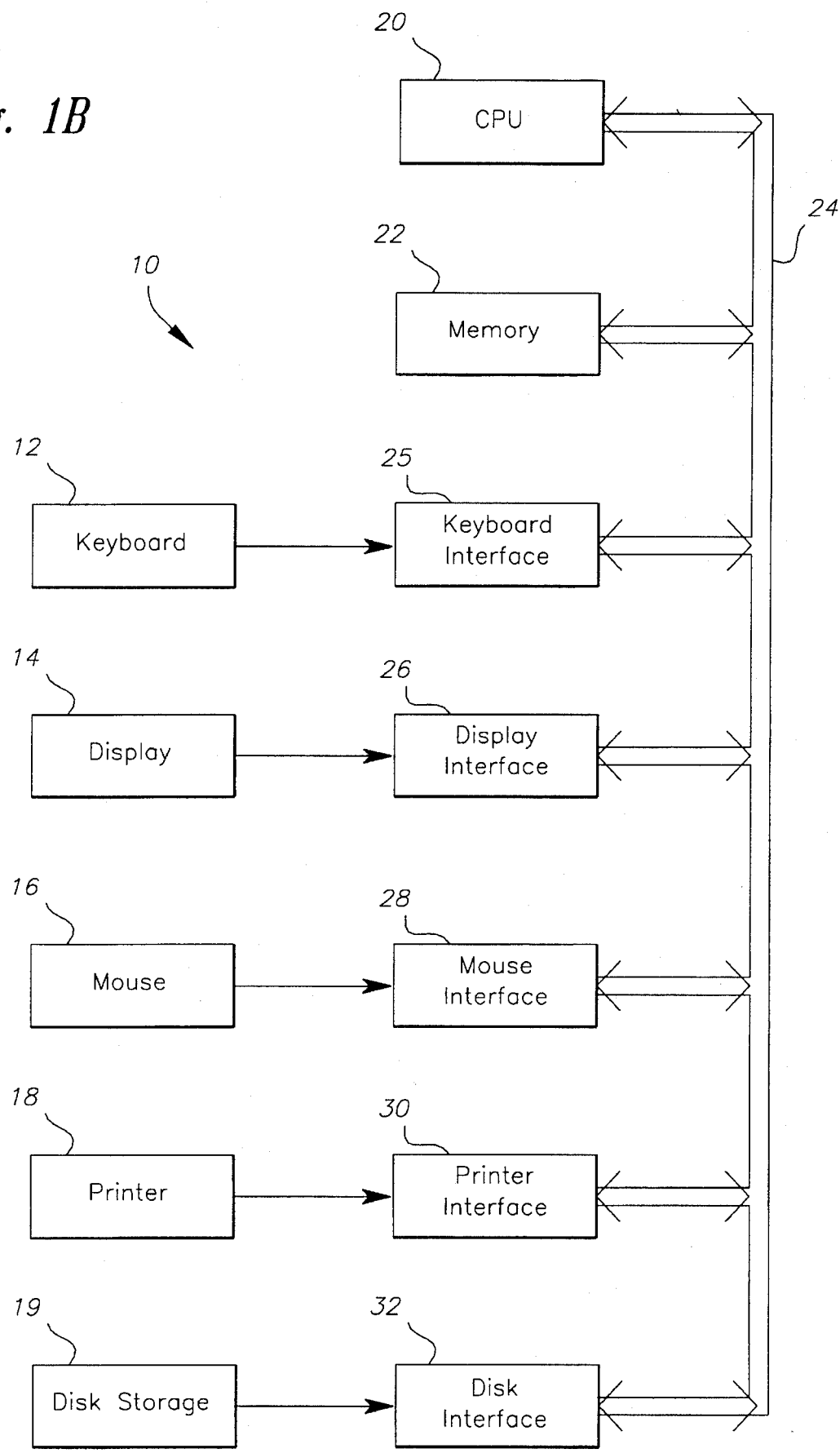
FIG. 1B is a block diagram of the computer of FIG. 1A.

The computer 10 has a central processor unit (CPU) 20, a memory 22, interconnected by a bus 24 carrying information and control signals, as shown in FIG. 1B. In addition, the computer 10 has a keyboard interface 25 coupling the computer 10 to the keyboard 12. Other interfaces include a display interface 26, a mouse interface 28, a printer interface 30, and a disk interface 32 coupling the display screen 14, the mouse 16, the printer 18, and the disk 19, respectively, to the computer 10. Each of these interfaces are coupled to the CPU 20 and the memory 22 by the bus 24. Each interface provides the appropriate data and control signals that allow the proper operation of the respective devices with the computer 10.

Figure 2:
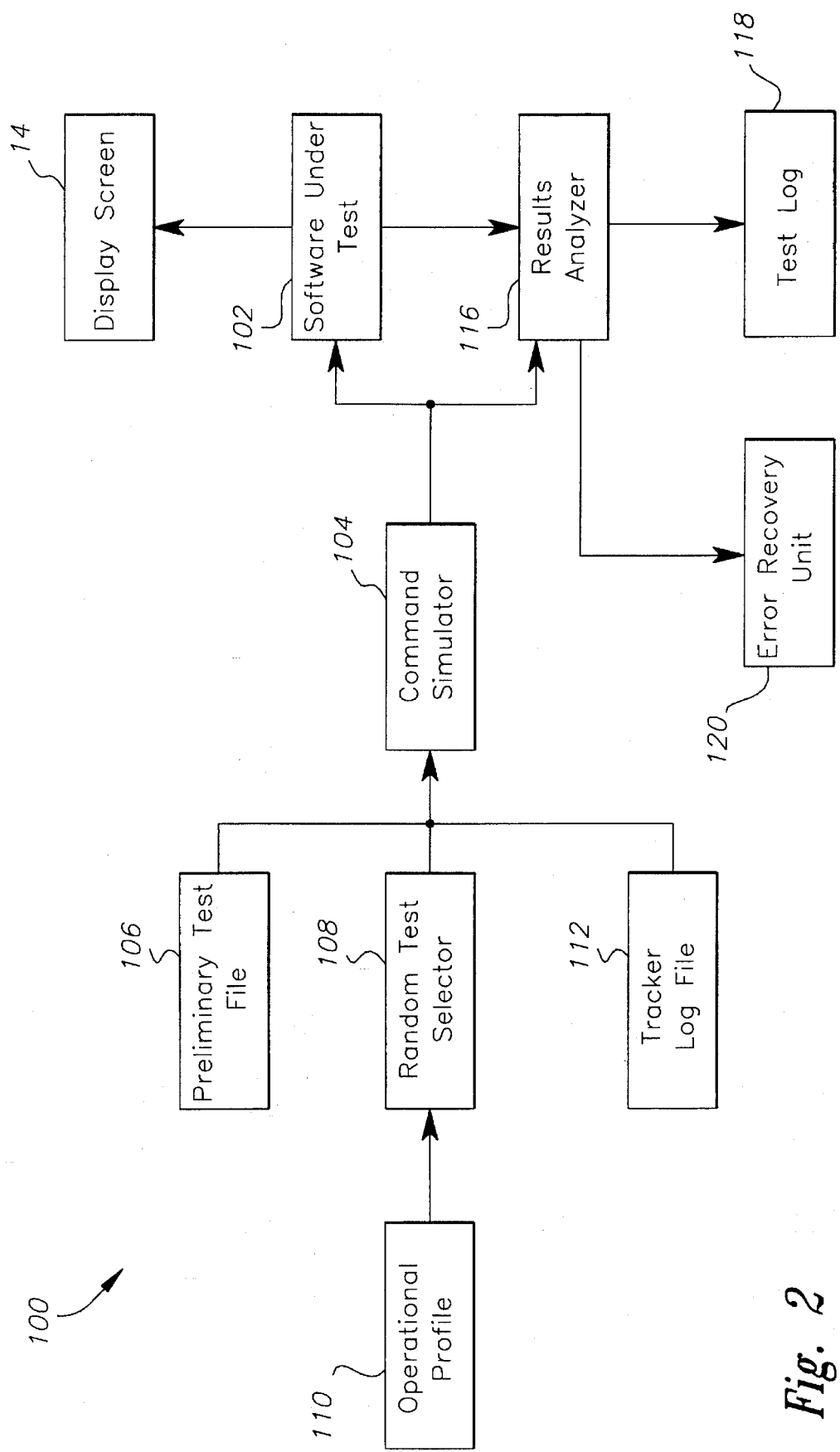
FIG. 2 is a function block diagram of the present invention.

Briefly, an automatic test system 100 embodying the present invention is shown in functional block diagram form in FIG. 2. The automatic test system 100, which operated on the computer 10, includes a command simulator 104 that simulates the selection of commands to be executed by the software under test 102. The commands are provided to the command simulator 104 from three alternate sources. The first source of commands is a preliminary test file 106 which contains a set of preliminary commands designed to test basic functionality of the software under test 102. The preliminary test file 106 is stored on the disk 19 (see FIG. 1B) and may be loaded into the memory 22 of the computer 10. The software under test 102 is required to first pass a series of preliminary tests to ensure that the software meets minimum acceptance standards. The second source of commands is a random test selector 108 that randomly selects commands for the command simulator 104. The random test selector 108 may use an operational profile 110 to aid in selecting commands. The operational profile 110 is stored on the disk 19 (see FIG. 1B), and may be loaded into the memory 22 of the computer 10. Each command executed by the software under test 102 is recorded in a tracker log file 112. This includes test commands from the preliminary test file 106 and the random test selector 108. The third source of commands for the command simulator 104 is the tracker log file 112 itself. The entire tracker log file 112, or any selected portion thereof, may be executed by the command simulator 104. The tracker log file 112 is stored on the disk 19 (see FIG. 1B), and is easily printed on the printer 18. When the tracker log file 112, or a portion thereof, is reexecuted, the reexecuted test commands are themselves stored in the tracker log file 112.

Following the execution of each command by the software under test 102, the software under test will produce certain results that may alter the display screen 14, or change certain parameters within the software under test 102 or in the computer 10 on which the software under test 102 is running. A results analyzer 116 analyzes the software under test 102 after the execution of each command to determine if the results are as expected.

The results analyzer 116 records the results of each command execution, including the occurrence of error conditions, in a test log 118. The test log 118 is stored on the disk 19 (see FIG. 1B), and may easily be printed on the printer 18 attached to the computer 10. An error recovery unit 120 within computer 10 restarts the random test procedure if the results analyzer 116 detects an error.

The following description provides operational details of the present invention. The automatic test system 100 uses two forms of automatic testing which provide thorough testing of computer software in less time and with lower cost than systems of the prior art. The automatic test system 100 first conducts a series of preliminary tests on the software as a form of "acceptance testing." The preliminary test file 106 contains a sequence of predetermined commands. These deterministic tests check the ability of the software under test 102 to meet minimum performance standards. The preliminary test file 106 includes command sequences such as opening and closing small files and large files, altering the display size on the display screen 14, and the like. The results of the preliminary tests are stored in the test log 118.

The user may examine the test log 118 as a means of determining the cause of an error in the software under test 102 detected during the preliminary testing procedure.

The automatic test system 100 will conduct random testing, the second form of automatic testing, only if the software under test 102 passes the preliminary testing procedure. Random testing involves opening and closing various files at random, randomly editing open files, and randomly selecting various keystroke commands in response to different screen displays on the display screen 14 attached to the computer 10. Random testing has several advantages over the deterministic testing used by prior art systems. With deterministic testing and with beta site testing, file opening and closing commands and other command sequences tend to be limited in variety and thus are less likely to discover errors in the software under test 102 that result from an unusual combination of command sequences. In contrast, the random testing of the present invention is not limited to the preconceived notions of command sequence structure of the deterministic testing systems. Thus, unusual combinations of file openings and other command sequences tends to discover errors in the software under test 102 more reliably than deterministic testing.

In addition, random testing allows the same software under test 102 to be tested simultaneously on multiple computer systems, thus reducing the overall time for testing. Prior art systems which use deterministic testing gain no advantage by running an automated test system on multiple computer systems since all computers would execute the exact same command sequence in the exact same order. However, random testing on multiple machines is effective since the random nature of the command sequence selection is different from computer to computer. For example, if the same software under test 102 were tested simultaneously on ten different computers using the principles of the present invention, the testing time would be substantially reduced because all ten machines would be executing different command sequences.

While the random test selector 108 operates in a completely random mode, and may use any combination of the command sequences available for the particular software under test 102, some combinations of command sequences which produce an error may never occur in actual use. Detecting these extraneous errors needlessly complicates the software testing process. For example, a completely random test system may open a file that is one pixel high and 28,000 pixels wide. This type of file will never be used thus, testing for the proper opening of such a file is unnecessary. Therefore, the presently preferred embodiment of the automatic test system 100 uses an operational profile 110 to create a probabilistic profile of end-user selections in response to particular program states. The operational profile contains command sequences that approximate the probabilistic profile. For example, if the end-user at a given program state is ten times more likely to open a file than to close a file, the operation profile for that particular program state will include ten times more open file commands than close commands. For purposes of the present application, an "end-user" is defined as the person or persons who are the intended users of the software under test 102. The person or persons using the automatic test system 100 will be referred to as "testers."

To create the operational profile 110, the software under test 102 is broken down into a series of program states that may be referred to as program levels, sublevels, sub-sublevels, and so forth. For example, when software under test 102 first begins to run, it may be thought of as an entry level, which may be designated as level 0. In level 0, the software under test 102 may display a series of program options on the display screen 14. These options may include, for example, opening a file, editing an already open file, printing an open file, or the like. If no files are currently open, the most common end-user response to level 0 may be to open a file. The operational profile 110 for level 0 of the software under test 102 provides a list of possible end-user responses to level 0. The operational profile 110 is constructed in a manner that takes into account the probabilities of the end-user selecting each of the possible options. In the example above where no files are open, there is no possibility that the end-user will edit or print a file. The operational profile 110 takes these factors into account in determining the most probable end-user selection. A typical end-user response in the above example is to open a file. This action will place the software under test 102 in a different program state, which may be designated as level 1.

Figure 3A:
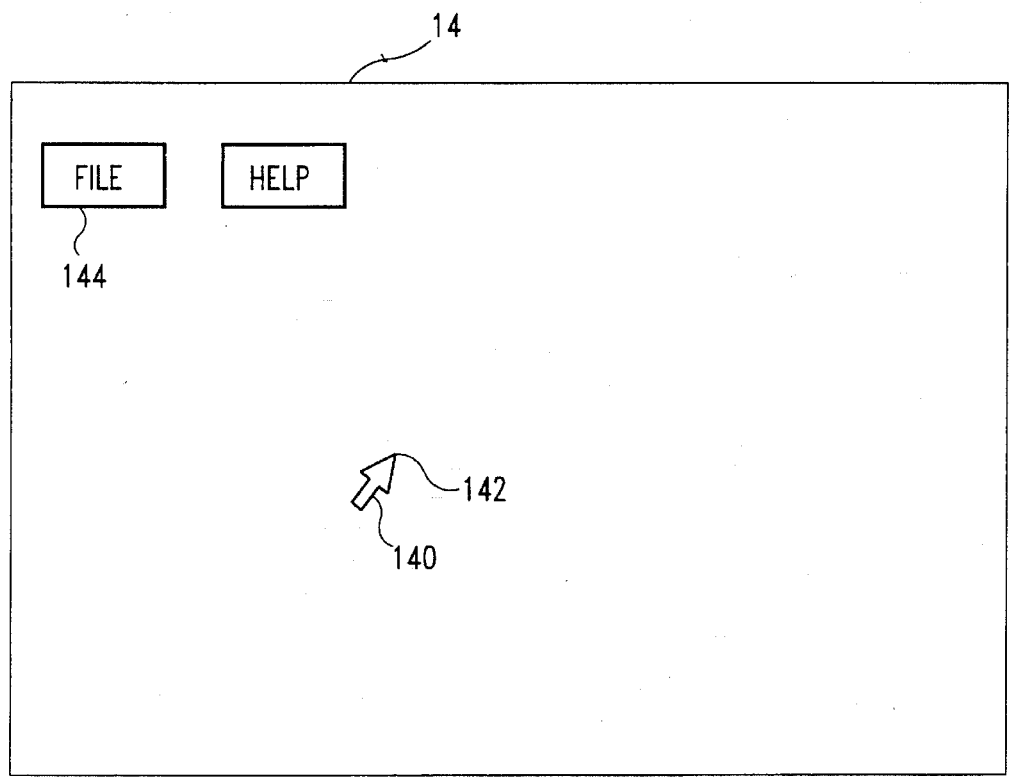
FIG. 3A illustrates a display screen and typical command selection procedures used by the present invention.
Figure 3B:
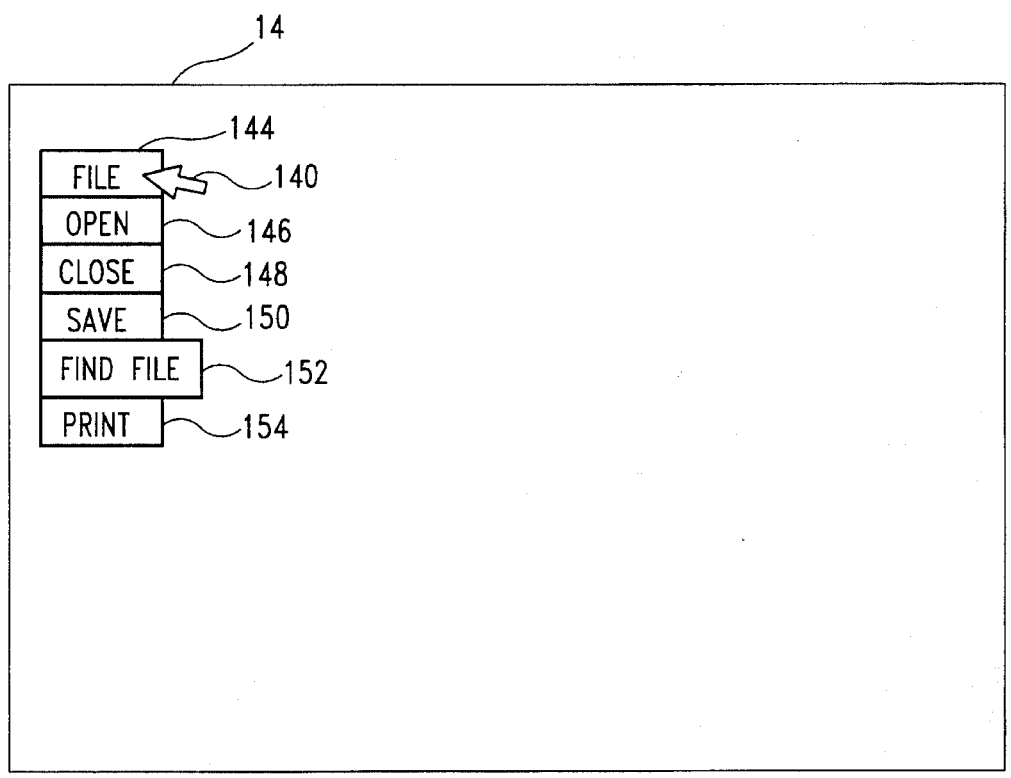
FIG. 3B illustrates a typical display screen displayed in response to the selection of a command from the list displayed in the display screen of FIG. 3A.

If the computer mouse 16 (see FIG. 1) is used by the software under test 102, a possible action may be to move the cursor on the display screen 14 by dragging the mouse 16 to reposition the cursor to a new location on the display screen and clicking the mouse button 17. In the example shown in FIG. 3A, the cursor 140 is initially positioned at a location 142 on the display screen 14 If an end-user were using the software under test 102, a normal response to the screen display of FIG. 3A may be to select the FILE command 144. This may be accomplished by moving the mouse to reposition the cursor 140 on the FILE command 144, and clicking the mouse button. In response to the selection of the FILE command 144, the software under test 102 may display the screen of FIG. 3B, which contains different file command options such as an OPEN file command 146, a CLOSE file command 148, a SAVE file command 150, a FIND FILE command 152, a PRINT file command 154, or the like. The end-user may select the desired command by repositioning the cursor 144 to the desired command and clicking the mouse button. In the example of FIG. 3B, the end-user may select the OPEN file command 146 by moving the mouse 16 to reposition the cursor 140 on the OPEN file command 146 and clicking the mouse button.

As is well known by those of ordinary skill in the art, the mouse interface 28 within the computer 10 determines the position of the cursor by tracking the coordinates of the mouse 16. When the mouse button 17 is clicked by the end-user, a mouse driver program (not shown) determines the display screen coordinates of the cursor 140 at the time the mouse button was clicked. These display screen coordinates are provided to the particular program and interpreted by that particular program. Of course, the action taken by the particular program in response to a selected command depends on the program itself.

The automatic test system 100 simulates the same type of activities by simulating the selection of commands by the mouse 16 or the keyboard 12. Instead of a mouse driver determining the display screen coordinates of the cursor 140 (see FIG. 3B) at the time the mouse button 17 was clicked, the automatic test system 100 passes display screen coordinates to the software under test 102 to simulate the selection of commands by the end-user. In the example of FIG. 3A, the FILE command 144 has particular display screen coordinates associated with the command. The automatic test system 100 can simulate the selection of the FILE command 144 by passing those particular display screen coordinates to the software under test 102 as well as the data indicating that the mouse button was clicked. Note that many mouse controls have more than one button. The automatic test system 100 can simulate different commands by passing data to the software under test 102 indicating that different mouse buttons 17 were clicked.

Figure 4:
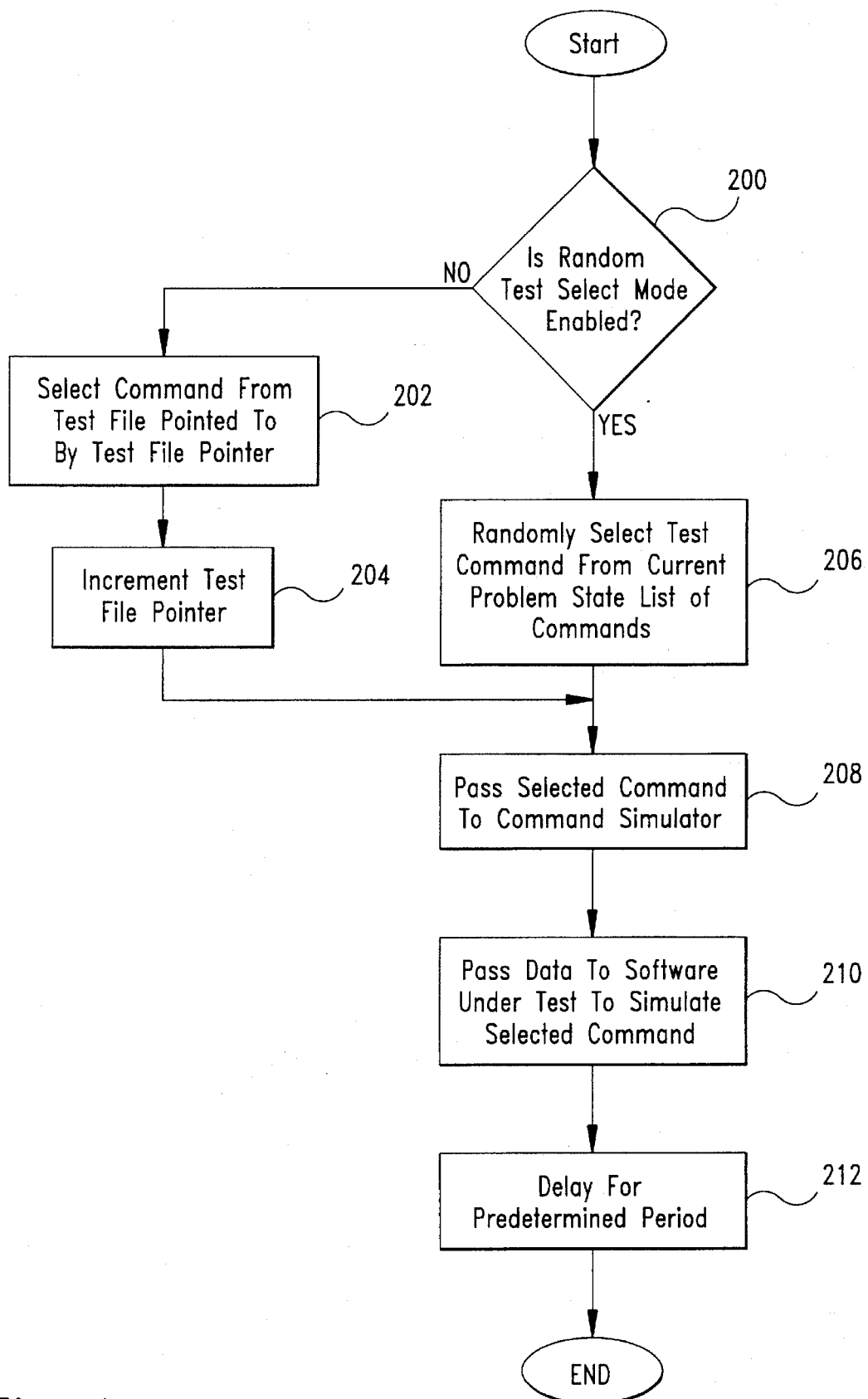
FIG. 4 is a flow chart illustrating a techniques used by the present invention to simulate commands.

The flow chart of FIG. 4 illustrates the techniques used by the present invention to simulate the selection of commands by an end-user. In decision 200, the automatic test system 100 tests to determine whether the random test selection mode is enabled. As previously noted, the random test mode will be enabled only if the software under test 102 has successfully completed the preliminary test mode. If the software under test 102 has not successfully completed the preliminary test mode, the result of decision 200 is NO. Note that if the automatic test system 100 is reexecuting a portion of the tracker log file 112, the random test mode will not be enabled. In that event, the result of decision 200 is also NO. If the result of decision 200 is NO, the test command in the test file currently pointed to by a test file pointer is selected in step 202. This test file may be either the preliminary test file 106 or the tracker log file 112. When the test command in the test file currently pointed to by a test file pointer is selected, the test file pointer is incremented in step 204.

If the automatic test system 100 is in the random test mode, the result of decision 200 is YES. In that event, step 206 randomly selects a test command from the list of test commands available for the current program state of the software under test 102. This may include a random selection of a test command from the operational profile 110, or a completely random selection from all test commands available for the current program state.

The selected test commands from step 202 and step 206 are passed to the command simulator 108 (see FIG. 2) in step 208. In step 210, the command simulator 108 passes the appropriate data to the software under test 102 to simulate the selected command. The automatic test system 100 delays a predetermined period of time in step 212 to allow the software under test 102 to execute the command. The predetermined period of time may vary depending on the selected command. For example, a command that requires the software under test 102 to open a file may take a longer period of time than a command such as changing menus on the display screen 14. Therefore, the command to open a file may have a longer delay period than a menu change command. Following the delay period, the results analyzer 116 (see FIG. 2) determines if the selected command was properly executed by the software under test 102. Details of the results analyzer 116 are provided below.

The automatic test software 100 may cause the software under test 102 to display a new menu sublevel, and to enter a sub-sublevel to test the function of mouse switches in a particular program level. For example, the automatic test system 100 may simulate the selection of the FILE command 144 in FIG. 3A by passing the display screen coordinates of the FILE command 144 to the software under test 102. In response to the selection of the FILE command 144, the software under test 102 may display the screen illustrated in FIG. 3B. Thus, the software under test 102 will enter a different level, sublevel or sub-sublevel than with the previous display screen of FIG. 3A. As an example of the types of commands that may be simulated, assume that the automatic test system begins with the software under test 102 in level 1, sublevel 0, sub-sublevel 0. For example, the test command "1, 0, 0, ME, 768, 300, 200, 0, 5; Test Case 2=Click Learning Menu," may be broken down into a series of command fields as shown in Table 1.

TABLE 1

Sample Command Data Fields

| Field Position | Field Parameter in Example | Description of Field |
| --- | --- | --- |
| 1 | 1 | Return Level |
| 2 | 0 | Return Sublevel |
| 3 | 0 | Return Sub-sublevel |
| 4 | ME | Type of Event |
| 5 | 768 (LCLICK) | Mouse Event Number |
| 6 | 300 | X Coordinate of Mouse Event |
| 7 | 200 | Y Coordinate of Mouse Event |
| 8 | 0 | 1 = Hide Application; 0 = No Hide |
| 9 | 5 | Delay Seconds After Command |
| 10 | Test Command 2 . . . | Comment Field for Test Command |

In the example above, the first three data fields specify the return location after the software under test 102 has executed the selected test command. The type of event in the example is a mouse event (ME) as indicated in data field position 4, indicating that the test command involves the computer mouse 16. The event number in data field position 5 indicates that the mouse event is clicking the left mouse button. The next two data fields indicate the X and Y coordinates, respectively, of the display screen 14 where the mouse is positioning the cursor 140 (see FIG. 3A) in order to click the left mouse button. In other words, these are the display screen coordinates to which the cursor 140 is pointing when the left mouse button is clicked. Data field position 8 indicates whether the automatic test system 100 will display anything on the display screen 14. With some software under test 102, the automatic test system 100 analyzes the contents of the display screen 14 to determine if a test command was properly executed. In this event, the automatic test system 100 will hide its display data so that the contents of the display screen 14 will only contain data generated by the software under test 102. If the automatic test system 100 does not hide its display data, the data displayed on the display screen 14 by the automatic test system 100 may interfere with an analysis of the display screen. With some software under test 102, the automatic test system 100 does not analyze the contents of the display screen 14. In that event, the automatic test system 100 need not hide its display data. The tester may find the display of data by the automatic test system 100 to be useful in determining the cause of an error in the software under test 102. The tester may alter the contents of data field position 8 to control the display of data by the automatic test system 100. Data field position 9 indicates the number of seconds of delay before the results analyzer 116 determines whether the software under test 102 properly executed the selected command. Data field position 10 contains comments that the user may insert into the command to indicate the type of command.

The data fields may vary if different test commands are executed. For example, if the selected test command is to enter a text string, the data field position following the type of event may indicate the number of characters in the text string, and the following data field position may be the actual text string. Those of ordinary skill in the art will appreciate that there are numerous techniques that may be used to represent test commands. The examples given above are merely representative of the type of test command data fields that may be used and should not be considered a limitation on the present invention.

The random test selector 108 randomly selects a test command from a list of test commands corresponding to the particular program level for the software under test 102. Once the command simulator 104 simulates the command, the return data fields in the command line direct the random test selector 108 to a specified return level, sublevel, and sub-sublevel from which to select the next test command. In the example given above, the return location data fields have values of 1, 0, 0, which instructs the random test selector 108 to return to level 1, sublevel 0, sub-sublevel 0 to select the next command. Note that in this example, the random test selector 108 returns to the same program state that it was in before the command simulator 104 simulated the selected command. A sample set of commands to test other functions in this particular program level are shown below in Table 2.

TABLE 2

Sample Test Commands

```
1, 0, 0, ME, 768, 150, 100, 0, 5; Click Upper Left
1, 0, 0, ME, 768, 150, 300, 0, 5; Click Lower Left
1, 0, 0, ME, 768, 500, 100, 0, 5; Click Upper Right
1, 0, 0, ME, 768, 500, 300, 0, 5; Click Lower Right
1, 0, 0, ME, 768,  25, 100, 0, 5; Click Upper Left Sound
1, 0, 0, ME, 768,  25, 300, 0, 5; Click Lower Left Sound
1, 0, 0, ME, 768, 600, 100, 0, 5; Click Upper Right Sound
1, 0, 0, ME, 768, 600, 300, 0, 5; Click Lower Right Sound
1, 0, 2, ME, 768, 500, 450, 0, 5; Click Forward Icon
0, 1, 1, ME, 768, 475, 450, 0, 5; Click Backward Icon
0, 0, 0, ME, 768, 100, 450, 0, 5; Click Main Menu
1, 0, 1, ME, 768, 600, 450, 0, 5; Click Info Button
```

Note that in the examples shown in Table 2, most of the test commands instruct the random test selector 108 to return to the same level, sublevel, and sub-sublevel in the software under test 102. Some of the commands, such CLICK FORWARD ICON, CLICK BACKWARD ICON, CLICK MAIN MENU, and CLICK INFO BUTTON do provide values for the return location data fields that are outside the current level of the software under test 102. For example, the CLICK MAIN MENU command has return location data field values of 0, 0, 0, which instructs the random test selector 108 to select a command from the test commands available for that particular program state. Since the proper execution of the CLICK MAIN MENU command will return the software under test 102 to program level 0,0,0, the automatic test system 100 will select command appropriate for the particular program state of the software under test 102. Similarly the CLICK FORWARD ICON command will cause the software under test 102 to display the next menu on the display screen 14 and to enter the program state 1, 0, 2. Therefore, the return location data fields associated with the CLICK FORWARD ICON command instruct the random test selector 108 to select the next command from a list of commands appropriate for the program state 1, 0, 2. These return location data fields are merely indicative of the type of values provided in a test command. Any set of return location data field values may be provided.

The random test selector 108 randomly selects a test command from the list above and passes the selected command to the command simulator 104. In turn, the command simulator 104 passes data simulating the selected command to the software under test 102 for execution. In the examples shown in Table 2, the random test selector 108 will continue to select test commands from the list in Table 2 until one of the four test commands with return location data fields for a different program level is selected. For example, if the CLICK MAIN MENU test command is selected, the random test selector 108 will randomly select a test command from the list of possible test commands associated with that particular program level. Note that the probabilities of test command selection may be readily altered by changing the parameters of one or more of the test commands. In the example of Table 2, there are twelve possible test commands, but only one test command, CLICK MAIN MENU, that returns to the Main Menu program state. To increase the probability that the automatic test system 100 will return to the Main Menu program state, one could insert the CLICK MAIN MENU test command into the list of possible test commands more than once. For example, placing the CLICK MAIN MENU test command into the list of test commands twice will nearly double the chances of returning to the Main Menu program state (2/13 vs. 1/12). Probabilities for other test command selections may be similarly altered. This requires the construction of a set of test commands for each of the possible program levels, sublevels, and sub-sublevels. The list of test commands for each program state is stored in the operational profile 110.

The operational profile 110 is constructed for the particular software under test 102 to predict probabilities of end-user choices for each of the program states. As previously discussed, there is a disadvantage in completely random testing of computer software because of the large number of errors that may occur due to command sequences that will never occur in actual use. The operational profile 110 is based on the expected selection of command options by the end-user. The operational profile is constructed for each software under test 102, and for each program level within the software under test 102. Initially, the operational profile 110 is constructed using an intuitive knowledge of the end-user, and the probable selection of command options by the end-user. If beta testing is used in addition to the testing by the automatic test system 100, the results of the beta testing may be used to modify the operational profile 110. Similarly, if the software under test 102 is released to the public, the result of feedback from the end-users may be used to modify the operational profile for future revisions of the software under test 102.

As previously noted, the automatic test system 100 records each command selected by the random test selector 108 in the tracker log file 112. The tracker log file 112 is a test file that may be replayed in whole or in part by the command simulator 104. This replay capability is useful in debugging errors that are detected by the results analyzer 116. For example, the tester may examine the test log 118 to analyze the errors detected by the results analyzer 116. The operation of the results analyzer 116 and the test log 118 will be discussed in detail below. By examining the test log 118, the tester may analyze a particular error and determine, based on experience, that the particular error may have occurred because of specific commands executed before the error occurred. For example, an error may have occurred because a file was not properly opened in a particular test command. The tester may determine that the file did not open properly because of a test command sequence of 15 to 20 commands preceding the error. The tester may select the portion of the tracker log file 112 for the 20 commands preceding the error and have the command simulator 104 cause the software under test 102 reexecute the selected commands. If the preceding 20 commands do not cause the error to occur, the tester may select the preceding 50 commands to reexecute in order to determine the cause of the error.

The tester may select the entire tracker log file 112 or any portion of the tracker log file using any well known program editor. The details of program editor operation are known to those skilled in the art and will not be discussed herein.

To avoid possible contamination of the tracker log file 112 in the event of an error in the software under test 102, the automatic test system 100 opens the tracker log file to record the selected test command, and then closes the tracker log file before the selected test command is actually executed by the software under test 102. This assures that the tracker log file 112 is not an open file at the moment the selected command is executed by the software under test 102. Similarly, the test log 118 is closed before the selected command is executed so it is a closed file at the time the selected test command is executed. The test log 118 is opened following the execution of a selected test command, and the test results are recorded. Then, the test log 118 is closed prior to the execution of the next test command.

Once the tracker log file 112 is created by the sequence of test commands selected by the random test selector 108, the tracker file is essentially like the preliminary test file in that it now contains a predetermined sequence of test command. In the presently preferred embodiment, the tracker log file 112 is renamed to be a test file similar to the preliminary test file. This prevents the tracker log file 112 from overwriting itself when it is reexecuted by the software under test 102.

Following the execution of a command by the software under test 102, the results analyzer 116 checks test parameters of the software under test 102 to assure that the command was properly executed. When a test command is executed by the software under test 102, there will be some change that can be detected by the results analyzer 116. For example, the execution of a command may result in a change in the contents of the display screen 14. A test command to open a file may result in the display screen 14 listing files that can be opened. As each command is executed by the software under test 102, the results analyzer 116 examines the contents of the display screen 14 or looks at other parameters such as the amount of total free memory available to determine if the software under test 102 has responded appropriately. If the display screen 14 does not contain the appropriate data, the results analyzer 116 interprets this as an error. If the execution of a particular command caused an unexpected change in the amount of total free memory, the results analyzer 16 interprets this as an error. For example, some operating systems generate a global error number that can be checked to determine if any error has occurred. This parameter may be used by the automatic test system 100 to detect an error in the software under test 102.

If the software under test 102 is operating in an environment such as Windows™, other parameters such as User Heap Free, GDI Heap Free, and Selectors may be examined by the results analyzer 116 to determine if an error occurred. The User Heap Free, GDI Heap Free, and Selectors are used by Windows™ in executing commands. These parameters are well known to those skilled in programming on a Windows™ operating system and will not be discussed in detail herein. Heap space is memory used by programs for temporary storage of variables. The User Heap Free is the part of the Windows™ operating system that is used to provide services to the software under test 102. If the software under test 102 is faulty, it can demand large amounts of User Heap Free space or not release the services, which results in the exhaustion of User Heap Free space. This will cause an error that can be easily detected by the automatic test system 100.

The GDI Heap Fee is another memory space allocated by Windows™ to display objects as requested by the software under test 102. As with the User Heap Free, the GDI Heap Free space may be exhausted by a fault in the software under test 102.

A selector in Windows™ identifies a segment of memory by reference to a descriptor table. An address in memory comprises an offset and a selector. The offset maps directly to the physical offset from the beginning of a particular segment in memory. The selector is an offset into the descriptor table that gives the physical segment. Thus, the selector is a pointer to a physical space in memory. Windows™ provides a limited number of selectors, which can be exhausted by a fault in the software under test 102.

The automatic test system 100 monitors these parameters to determine if they are returned to their initial values after the execution of commands. If these parameters are not returned to their initial values following the execution of commands, the limited memory space allocated to the parameters will be used up and an out of memory error will occur even though the total free memory may not be used up. If these parameters do not return to their initial values, the results analyzer 116 interprets this as an error. It is obvious to those skilled in the art that many possible parameters can be used to detect errors in the software under test 102. The examples presented above are illustrative of the parameters that can be used and should not be considered a limitation in the present invention. These various status indicators will be generally referred to as test parameters.

The results analyzer 116 analyzes each command and records the results in the test log 118. The recorded results may include the value of all test parameters, or may include only selected test parameters. The test log 118 can record the contents of various registers within the computer 10 (see FIG. 1B) such as the Instruction Pointer, the Stack Pointer, and other status registers. The tester can specify which registers should be monitored during the testing process. The test log has a format similar to that of the tracker log file 112 so that the two files are easily read by the tester. However, it is not essential to the operation of the automatic test system 100 that the formats of the tracker log file 112 and the test log 118 be similar. The tester uses the test log 118 to determine the cause for errors detected in the random testing mode. The tester can examine the test log 118 as an aid in determining the cause of an error.

The automatic test system 100 can treat errors in two different manners. First, when the results analyzer 116 detects an error, the error recovery unit 120 can force the automatic test system 100 to restart as if the computer 10 (see FIG. 1B) is just being started. As previously discussed, the test log 118 records the results of each command executed by the software under test 102. Thus, the tester has a complete record of all commands executed by the software under test 102 up to and including the command that caused the error; the automatic test system 100 restarts to continue testing the software under test 102. Alternatively, the automatic test system 100 can ignore the error and continue testing as if the error did not occur. In that event, the error recovery unit 120 simply ignores the occurrence of the error, although the error is recorded in the test log 118, as previously described. This allows testing of the software under test 102 to continue from the point at which the error occurred.

In extreme cases, a catastrophic error may cause the automatic test system 100 to fail. These failures may require manual intervention by the tester to restart the testing procedures. However, these catastrophic failures are not common and are usually detected in the preliminary test stages. Most errors in the software under test 102 only require the automatic test system 100 to restart the testing procedures or ignore the error and continue testing. The automatic test system 100 may restart the testing procedures in the preliminary test mode. Alternatively, the automatic test system 100 may restart in the random test mode.

As previously stated, random testing allows error recovery since the command sequence selected after the restart of testing is not likely to be the exact command sequence that caused an error in the first place. Thus, the software under test 102 can continue to be debugged without requiring manual intervention after each occurrence of an error. Furthermore, some flaws in the software under test 102 will cause repeated errors in the testing procedures. The random testing conducted by the present invention will detect each of these errors and provide data to the tester indicating that many combinations of commands may cause the same error. This allows the tester to more easily determine a common cause of the errors.

The inventive method involves the preliminary testing of initial parameters of the software under test 102 by executing a predetermined sequence of test commands stored in the preliminary test file 106. The results of the preliminary testing are recorded in the test log 118. If the software under test 102 passes the preliminary tests, a series of random test command sequences are generated by the random test selector 108. The sequence of selected test commands is stored in the tracker log file 112. The results of each test command are verified by the results analyzer 116 and recorded in the test log 118. Any errors detected by the results analyzer 116 are also recorded in the test log 118. The random test sequence is automatically restarted if an error is detected so that testing procedures may continue. The tester may examine the test log 118 to determine the probable source of detected errors in the software under test 102. The tester may select portions of the tracker log file 112 to reexecute. The selected portions of the tracker log file are reexecuted by the command simulator 104. The results of the reexecution are analyzed by the results analyzer 116 and stored in the test log 118. The sequence of reexecuted commands is also stored in the tracker log file 112. The list of possible test commands is constructed for each program state of the software under test 102 and stored in the operational profile 110.

Those skilled in the art will appreciate that the new approach to automated test software taken by the present invention greatly increases the overall speed and decreases the cost of software testing. The random testing of the present invention can detect errors which are often undetected by deterministic test and beta test procedures of the prior art.

It is to be understood that, even though various embodiments and advantages of the present invention have been set forth in the foregoing description, the above disclosure is illustrative only, and changes may be made in detail and yet remain within the broad principles of the present invention. Therefore, the present invention is to be limited only by the appended claims.

We claim:

1. A system for automatically testing computer software and detecting errors in the computer software, the system comprising:

a preliminary test file containing a series of predetermined commands for the computer software to test initial parameters of the computer software;

an operational profile containing a list of end-user choices in response to a particular program state of the computer software, said list being constructed according to probabilities of end-user choices in response to said particular program state;

a random test selector to randomly select a series of commands from said operational profile for the computer software to execute;

a tracker log file to record each of said random series of commands selected by said random test selector;

means for selecting a portion of said tracker log file;

a command simulator simulating on the computer software the selection of said predetermined commands, said random series of commands, and at least said selected portion of said tracker log;

a results analyzer analyzing at least one test parameter of the computer software after the execution by the computer software of each of said predetermined commands, said random series of commands, and said selected portion of said tracker log file to determine if each of said predetermined commands, said random series of commands, and said selected portion of said tracker log file was properly executed by the computer software, said results analyzer generating a test result following the execution of each of said predetermined commands, said random series of commands, and said selected portion of said tracker log file;

a test log file recording said test results for each of said predetermined commands, said random series of commands, and said selected portion of said tracker log file; and an error recovery unit automatically restarting the computer software to continue testing the computer software if one of said random series of commands was not properly executed by the computer software.

2. The system of claim 1, further including examination means for examination of said test log to determine if any of said randomly selected series of commands was not properly executed by the computer software.

3. The system of claim 1 wherein said preliminary test file contains commands for the computer software to open and close a preselected series of computer files to test the ability of the computer software to open and close computer files of different sizes, said initial parameters being file sizes.

4. The system of claim 1, further including a display screen and wherein said preliminary test file contains commands for the computer software to resize screen displays on said video display screen in a preselected fashion to test the ability of the computer software to accommodate different display screen sizes, said initial parameters being display screen sizes.

5. The system of claim 1 wherein said preliminary test file contains commands for the computer software to edit files in a preselected fashion to test predetermined parameters of the computer software, said initial parameters being file editing capability.

6. The system of claim I wherein said random test selector randomly selects commands from said operational profile which cause the computer software to open and close computer files to test the ability of the computer software to open computer files.

7. The system of claim 6 wherein said random test selector randomly selects commands from said operational profile which cause the computer software to edit said opened computer files to test the ability of the computer software to edit said opened computer files.

8. The system of claim 1 wherein said operational profile contains a different probability of end-user choices for each of said particular program states.

9. The system of claim 1, further including examination means for examination of said test log to determine if any of said randomly selected series of commands was not properly executed by the computer software.

10. A system for automatically testing computer software and detecting errors in the computer software, the system comprising:

a preliminary test file containing a series of predetermined commands for the computer software to test initial parameters of the computer software;

an operational profile containing a list of end-user choices in response to a particular program state of the computer software, said list being constructed according to probabilities of end-user choices in response to said particular program state;

a random test selector to randomly select a series of commands from said operational profile for the computer software to execute;

a tracker log file to record each of said random series of commands selected by said random test selector;

a command simulator simulating on the computer software the selection of said predetermined commands, said random series of commands, and at least a portion of said tracker log; and a results analyzer analyzing at least one test parameter of the computer software after the execution by the computer software of each of said predetermined commands, said random series of commands, and said portion of said tracker log file to determine if each of said predetermined commands, said random series of commands, and said portion of said tracker log file was properly executed by the computer software, said results analyzer generating a test result following the execution of each of said predetermined commands, said random series of commands, and said portion of said tracker log file.

11. The system of claim 10, further including examination means for examination of said test log to determine if any of said randomly selected series of commands was not properly executed by the computer software.

12. The system of claim 10, further including selection means for selecting a portion of said random series of commands recorded by said tracker log file for reexecution by said command simulator.

13. The system of claim 10 wherein said preliminary test file contains commands for the computer software to open and close a preselected series of computer files to test the ability of the computer software to open and close computer files of different sizes, said initial parameters being file sizes.

14. The system of claim 10, further including a display screen and wherein said preliminary test file contains commands for the computer software to resize screen displays on said video display screen in a preselected fashion to test the ability of the computer software to accommodate different display screen sizes, said initial parameters being display screen sizes.

15. The system of claim 10 wherein said preliminary test file contains commands for the computer software to edit files in a preselected fashion to test predetermined parameters of the computer software, said initial parameters being file editing capability.

16. The system of claim 10 wherein said random test selector randomly selects commands from said operational profile which cause the computer software to open and close computer files to test the ability of the computer software to open computer files.

17. The system of claim 16 wherein said random test selector randomly selects commands from said operational profile which cause the computer software to edit said opened computer files to test the ability of the computer software to edit said opened computer files.

18. The system of claim 10 wherein said operational profile contains a different probability of end-user choices for each of said particular program states.

19. A system for automatically testing computer software and detecting errors in the computer software, the system comprising:

an operational profile containing a list of end-user choices in response to a particular program state of the computer software, said list being constructed according to probabilities of end-user choices in response to said particular program state;

a random test selector to randomly select a series of commands from said operational profile for the computer software to execute;

a tracker log file to record each of said random series of commands selected by said random test selector;

means for selecting a portion of said tracker log file;

a command simulator simulating on the computer software the selection of said random series of commands, and at least said selected portion of said tracker log;

a results analyzer analyzing at least one test parameter of the computer software after the execution by the computer software of each of said random series of commands, and said portion of said tracker log file to determine if each of said random series of commands and said selected portion of said tracker log file was properly executed by the computer software, said results analyzer generating a test result following the execution of each of said random series of commands and said selected portion of said tracker log file;

a test log file recording said test results for each of said random series of commands and said selected portion of said tracker log file; and an error recovery unit automatically restarting the computer software to continue testing the computer software if one of said random series of commands was not properly executed by the computer software.

20. The system of claim 19, further including examination means for examination of said test log to determine if any of said randomly selected series of commands was not properly executed by the computer software.

21. The system of claim 19 wherein said random test selector randomly selects commands from said operational profile which cause the computer software to open and close computer files to test the ability of the computer software to open computer files.

22. The system of claim 21 wherein said random test selector randomly selects commands from said operational profile which cause the computer software to edit said opened computer files to test the ability of the computer software to edit said opened computer files.

23. A system for automatically testing computer software and detecting errors in the computer software, the system comprising:

an operational profile containing a list of end-user choices in response to a particular program state of the computer software, said list being constructed according to probabilities of end-user choices in response to said particular program state;

a random test selector to randomly select a series of commands from said operational profile for the computer software to execute;

a tracker log file to record each of said random series of commands selected by said random test selector;

a command simulator simulating on the computer software the selection of said random series of commands, and at least a portion of said tracker log; and a results analyzer analyzing at least one test parameter of the computer software after the execution by the computer software of each of said random series of commands and said portion of said tracker log file to determine if each of said random series of commands and said portion of said tracker log file was properly executed by the computer software, said results analyzer generating a test result following the execution of each of said random series of commands and said portion of said tracker log file.

24. The system of claim 23, further including examination means for examination of said test log to determine if any of said randomly selected series of commands was not properly executed by the computer software.

25. The system of claim 23, further including selection means for selecting a portion of said random series of commands recorded by said tracker log file for reexecution by said command simulator.

26. The system of claim 23 wherein said random test selector randomly selects commands from said operational profile which cause the computer software to open and close computer files to test the ability of the computer software to open computer files.

27. The system of claim 26 wherein said random test selector randomly selects commands from said operational profile which cause the computer software to edit said opened computer files to test the ability of the computer software to edit said opened computer files.

28. The system of claim 23 wherein said operational profile contains a different probability of end-user choices for each of said particular program states.

29. A system for automatically testing computer software and detecting errors in the computer software, the system comprising:

a random test selector to randomly select a series of commands for the computer software to execute;

a tracker log file to record each of said random series of commands selected by said random test selector;

means for selecting a portion of said tracker log file;

a command simulator simulating on the computer software the selection of said random series of commands, and at least said selected portion of said tracker log;

a results analyzer analyzing at least one test parameter of the computer software after the execution by the computer software of each of said random series of commands, and said portion of said tracker log file to determine if each of said random series of commands and said selected portion of said tracker log file was properly executed by the computer software, said results analyzer generating a test result following the execution of each of said random series of commands and said selected portion of said tracker log file;

a test log file recording said test results for each of said random series of commands and said selected portion of said tracker log file; and an error recovery unit automatically restarting the computer software to continue testing the computer software if one of said random series of commands was not properly executed by the computer software.

30. The system of claim 29, further including examination means for examination of said test log to determine if any of said randomly selected series of commands was not properly executed by the computer software.

31. The system of claim 29 wherein said random test selector randomly selects commands which cause the computer software to open and close computer files to test the ability of the computer software to open computer files.

32. The system of claim 31 wherein said random test selector randomly selects commands which cause the computer software to edit said opened computer files to test the ability of the computer software to edit said opened computer files.

33. A system for automatically testing computer software and detecting errors in the computer software, the system comprising:
   a random test selector to randomly select a series of commands for the computer software to execute;
   a tracker log file to record each of said random series of commands selected by said random test selector;
   a command simulator simulating on the computer software the selection of said random series of commands, and at least a portion of said tracker log; and
   a results analyzer analyzing at least one test parameter of the computer software after the execution by the computer software of each of said random series of commands and said portion of said tracker log file to determine if each of said random series of commands and said portion of said tracker log file was properly executed by the computer software, said results analyzer generating a test result following the execution of each of said random series of commands and said portion of said tracker log file.

34. The system of claim 33, further including a test log file recording said test results for each of said random series of commands and said portion of said tracker log file.

35. The system of claim 33, further including an error recovery unit automatically restarting the computer software to continue testing the computer software if one of said random series of commands was not properly executed by the computer software.

36. The system of claim 33, further including examination means for examination of said test log to determine if any of said randomly selected series of commands was not properly executed by the computer software.

37. The system of claim 33, further including selection means for selecting a portion of said random series of commands recorded by said tracker log file for reexecution by said command simulator.

38. The system of claim 33 wherein said random test selector randomly selects commands which cause the computer software to open and close computer files to test the ability of the computer software to open computer files.

39. The system of claim 38 wherein said random test selector randomly selects commands which cause the computer software to edit said opened computer files to test the ability of the computer software to edit said opened computer files.

40. A method for automatically testing computer software and detecting errors in the computer software, the method comprising the steps of:
   (a) testing initial parameters of the computer software by having the computer software execute a series of predetermined commands for the computer software;
   (b) randomly selecting a series of commands from an operational profile containing a list of end-user choices in response to a particular program state of the computer software;
   (c) recording each of said randomly selected commands in a tracker log file;
   (d) executing on the computer software said predetermined commands and said randomly selected commands;
   (e) analyzing the computer software after the execution of each of said predetermined commands and said randomly selected commands to determine if each of said predetermined commands and said randomly selected commands was properly executed by the computer software;
   (f) generating a test result following the execution of each of said predetermined commands and said randomly selected commands;
   (g) recording said test results in a test log file for each of said predetermined commands and said randomly selected commands; and
   (h) automatically restarting the computer software to continue testing the computer software if one of said randomly selected commands was not properly executed by the computer software.

41. The method of claim 40, further including the steps of:
   (i) examining said test log file to determine if any of said randomly selected commands was not properly executed by the computer software;
   (j) selecting a portion of said tracker log file for reexecution;
   (k) reexecuting said selected portion of said tracker log file; and
   (l) using steps (e)–(g) to analyze, generate a test result and record said test result for each of the commands in said selected portion of said tracker log file.

42. The method of claim 40 wherein said step (a) of testing initial parameters includes commands for the computer software to open and close a preselected series of computer files to test the ability of the computer software to open and close computer files of different sizes.

43. The method of claim 40 wherein said step (a) of testing initial parameters includes commands for the computer software to resize screen displays on a video display screen in a preselected fashion to test the ability of the computer software to accommodate different display screen sizes.

44. The method of claim 40 wherein said step (a) of testing initial parameters includes commands for the computer software to edit files in a preselected fashion to test predetermined parameters of the computer software.

45. The method of claim 40, further including the step of constructing said list according to probabilities of end-user choices in response to said particular program state.

46. The method of claim 40 wherein said step (b) of randomly selecting a series of commands from said operational profile includes randomly selecting commands for the computer software to open and close computer files to test the ability of the computer software to open computer files.

47. The method of claim 46 wherein said step (b) of randomly selecting a series of commands from said operational profile includes randomly selecting commands for the computer software to edit said opened computer files to test the ability of the computer software to edit said opened computer files.

48. A method for automatically testing computer software and detecting errors in the computer software, the method comprising the steps of:
   (a) testing initial parameters of the computer software by having the computer software execute a series of predetermined commands for the computer software;
   (b) randomly selecting a series of commands from an operational profile containing a list of end-user choices in response to a particular program state of the computer software;
   (c) recording each of said randomly selected commands in a tracker log file;

(d) executing on the computer software said predetermined commands and said randomly selected commands;

(e) analyzing the computer software after the execution of each of said predetermined commands and said randomly selected commands to determine if each of said predetermined commands and said randomly selected commands was properly executed by the computer software; and (f) generating a test result following the execution of each of said predetermined commands and said randomly selected commands.

49. The method of claim 48, further including the steps of:

(g) selecting a portion of said tracker log file for reexecution;

(h) reexecuting said selected portion of said tracker log file; and (i) using steps (e)–(f) to analyze and generate a test result.

50. The method of claim 48 wherein said step (a) of testing initial parameters includes commands for the computer software to open and close a preselected series of computer files to test the ability of the computer software to open and close computer files of different sizes.

51. The method of claim 48 wherein said step (a) of testing initial parameters includes commands for the computer software to resize screen displays on a video display screen in a preselected fashion to test the ability of the computer software to accommodate different display screen sizes.

52. The method of claim 48 wherein said step (a) of testing initial parameters includes commands for the computer software to edit files in a preselected fashion to test predetermined parameters of the computer software.

53. The method of claim 48, further including the step of constructing said list according to probabilities of end-user choices in response to said particular program state.

54. The method of claim 48 wherein said step (b) of randomly selecting a series of commands from said operational profile includes randomly selecting commands for the computer software to open and close computer files to test the ability of the computer software to open computer files.

55. The method of claim 54 wherein said step (b) of randomly selecting a series of commands from said operational profile includes randomly selecting commands for the computer software to edit said opened computer files to test the ability of the computer software to edit said opened computer files.

56. A method for automatically testing computer software and detecting errors in the computer software, the method comprising the steps of:

(a) randomly selecting a series of commands from an operational profile containing a list of end-user choices in response to a particular program state of the computer software;

(b) recording each of said randomly selected commands in a tracker log file;

(c) executing on the computer software said randomly selected commands;

(d) analyzing the computer software after the execution of each of said randomly selected commands to determine if each of said randomly selected commands was properly executed by the computer software;

(e) generating a test result following the execution of each of said randomly selected commands;

(f) recording said test results in a test log file for each of said randomly selected commands; and (g) automatically restarting the computer software to continue testing the computer software if one of said randomly selected commands was not properly executed by the computer software.

57. The method of claim 56, further including the steps of:

(h) examining said test log file to determine if any of said randomly selected commands was not properly executed by the computer software;

(i) selecting a portion of said tracker log file for reexecution;

(j) reexecuting said selected portion of said tracker log file; and (k) using steps (d)–(f) to analyze, generate said test result and record said test result for each of the commands in said selected portion of said tracker log file.

58. The method of claim 56, further including the step of constructing said list according to probabilities of end-user choices in response to said particular program state.

59. The method of claim 56 wherein said step (b) of randomly selecting a series of commands from said operational profile includes randomly selecting commands for the computer software to open and close computer files to test the ability of the computer software to open computer files.

60. The method of claim 59 wherein said step (b) of randomly selecting a series of commands from said operational profile includes randomly selecting commands for the computer software to edit said opened computer files to test the ability of the computer software to edit said opened computer files.

61. A method for automatically testing computer software and detecting errors in the computer software, the method comprising the steps of:

(a) randomly selecting a series of commands for the computer software to execute;

(b) recording each of said randomly selected commands in a tracker log file;

(c) executing on the computer software said randomly selected commands;

(d) analyzing the computer software after the execution of each of said randomly selected commands to determine if each of said randomly selected commands was properly executed by the computer software; and (e) generating a test result following the execution of each of said randomly selected commands.

62. The method of claim 61, further including the step of recording said test results in a test log file for each of said randomly selected commands.

63. The method of claim 61, further including the step of automatically restarting the computer software to continue testing the computer software if one of said randomly selected commands was not properly executed by the computer software.

64. The method of claim 61, further including the steps of:

(f) examining said test log file to determine if any of said randomly selected commands was not properly executed by the computer software;

(g) selecting a portion of said tracker log file for reexecution;

(h) reexecuting said selected portion of said tracker log file; and (i) using step (d)–(e) to analyze and generate said test result for each of the commands in said selected portion of said tracker log file.

65. The method of claim 61 wherein said step (a) of randomly selecting a series of commands includes randomly selecting commands for the computer software to open and close computer files to test the ability of the computer software to open computer files.

66. The method of claim 65 wherein said step (a) of randomly selecting a series of commands from said operational profile includes randomly selecting commands for the computer software to edit said opened computer files to test the ability of the computer software to edit said opened computer files.

* * * * *